R. H. RICE.
STEP BEARING.
APPLICATION FILED NOV. 14, 1905.
974,186.
Patented Nov. 1, 1910.
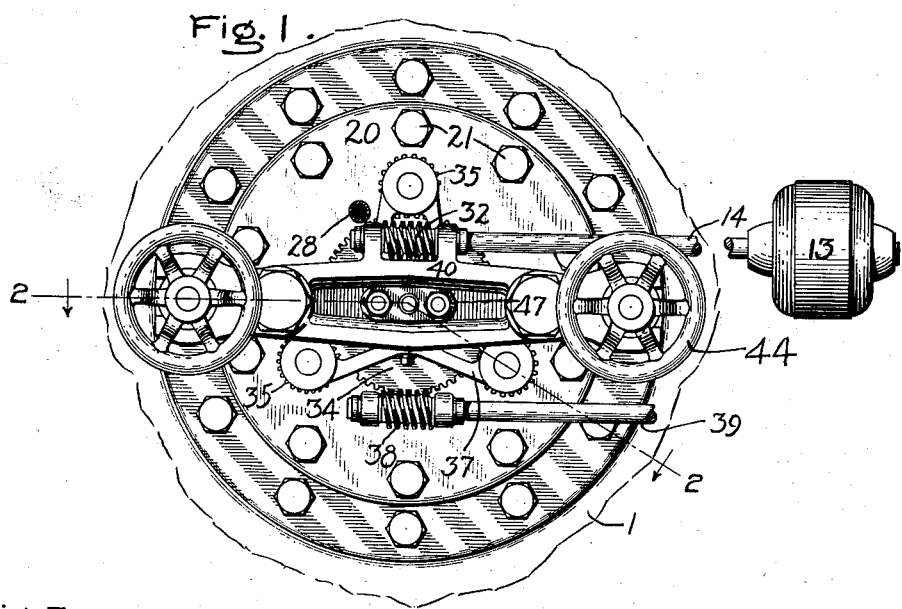
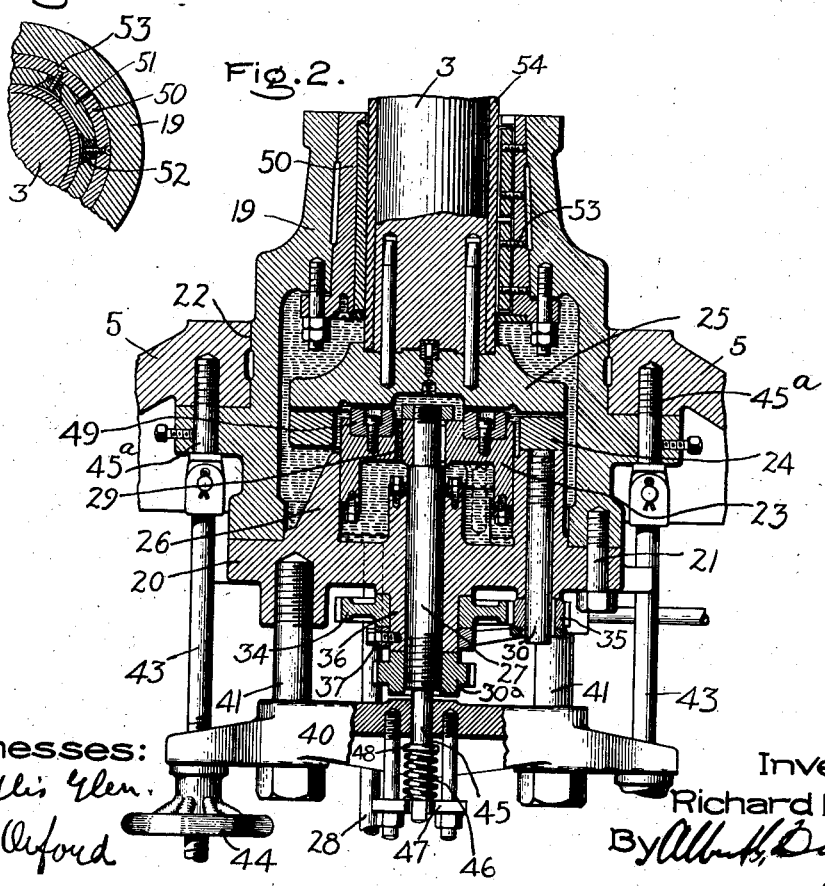
Witnesses:
J. Ellis Glen.
Helen Orford.
Inventor,
Richard H. Rice,
By Albert H. Davis
Att'y.

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

STEP-BEARING.

974,186.  Specification of Letters Patent.  Patented Nov. 1, 1910.

Application filed November 14, 1905. Serial No. 287,288.

*To all whom it may concern:*

Be it known that I, RICHARD H. RICE, a citizen of the United States, residing at Lynn, county of Essex, State of Massachusetts, have invented certain new and useful Improvements in Step-Bearings, of which the following is a specification.

My invention relates to bearings which are particularly applicable to vertical shafts, such for example as are used in turbines of the well-known Curtis type. While I have shown and described the invention as used in connection with this class of apparatus, I desire to have it understood that it is not limited thereto in all respects.

The invention relates more especially to step-and-guide bearings of that type wherein main and auxiliary bearing blocks are employed, the first operating to sustain the weight of the shaft and its attached parts under normal conditions and the second to sustain it under emergency conditions.

One object of the invention is to provide a bearing of improved construction whereby adjustment of the bearing blocks to obtain the proper clearance between relatively movable buckets and other parts of the turbine is greatly facilitated.

A further object is to provide a construction which permits of a more convenient removal of the bearing, and also increases accessibility of the parts thereof.

In the accompanying drawings which illustrate one embodiment of my invention, Figure 1 is a bottom plan view of the bearing; Fig. 2 is a section on the line 2—2 of Fig. 1; and Fig. 3 is a detail view of a portion of the guide-bearing.

Referring to the drawing, the step-bearing shown comprises a casing 19 into which extends the lower end of the turbine shaft 3. This shaft carries the bucket wheels of the turbine rotor. The wheel buckets which are usually arranged in rows with intermediates between the rows are separated from the latter and the nozzles by a slight clearance. The details of the bearing will be described more fully hereinafter. For the present it will suffice to say that it comprises a vertically adjustable bearing block by means of which the position of the shaft and through it the clearance of the buckets can be adjusted. The necessity for adjusting the clearance between the buckets and the adjacent parts arises from various causes such as unequal expansion of the bucket wheels, or the differential expansion of the shaft and casing, or variations in load. The bottom of the casing 19 is closed by a plate or head 20 which is secured in place by the bolts 21. The casing is carefully fitted and secured in an opening 22 in the base of the turbine. The interior of the casing comprises a chamber considerably larger in diameter than the shaft and containing the main lower bearing block 23, the auxiliary bearing block 24, and the upper bearing block 25, which is doweled and keyed to the lower end of the turbine shaft. The lower bearing blocks are prevented from rotating but are capable of vertical adjustment so as to adjust the position of the shaft. The bottom plate 20 of the bearing casing is provided with a cylindrical extension 26 which extends into the bearing chamber and forms a guide for the main bearing block. Secured to the main bearing block and extending through the bottom plate 20 is the adjusting screw 27, packing being employed around the stem of the screw to prevent leakage. Between the upper and lower bearing blocks is formed a chamber which communicates with a second chamber formed between the main bearing block and the bottom plate. Fluid under a suitable pressure is supplied to the lower chamber through a pipe or conduit 28 and from the lower chamber the fluid passes to the upper chamber between the bearing blocks by means of the passage 29. The effective pressure on the underside of the main bearing block considerably exceeds the effective pressure on the upper side, so that the fluid pressure while being sufficient to support the shaft and maintain a separating lubricating film between the blocks, will also hydraulically support the lower bearing block.

The auxiliary bearing block 24 is annular in shape and arranged concentrically with respect to the main block. It is supported upon the vertically-extending screws 30, three or more in number, arranged equidistant around the block and extending through the wall of the cylindrical extension 26. By means of these screws the auxiliary bearing block can be adjusted to and from the upper bearing block. The normal position of this auxiliary bearing block is slightly below the top of the main bearing block, by a distance about .03 of an inch less than the clearance, so as to receive the weight of the shaft when the fluid pressure supporting the main blocks fails, thus relieving the main block from the weight of the shaft and preventing its probable injury. The screw 27 of the main bearing block is actuated by the nut 30ª which forms a gear wheel meshing with the worm 32 on the motor shaft 14.

The several screws for adjusting the auxiliary block are operated by means of a gear wheel 34 which meshes with pinions 35, feathered to the lower ends of the screws. The gear wheel 34 is mounted on an extension 36 on the bottom plate 20 and is held in position by the hub of the spider 37. The arms of the spider serve to support the pinions 35. The gear 34 is rotated by a worm 38 on the shaft 39, which shaft may be operated from the motor 13, or in any suitable manner. The nut 30ª abutting the extension 36 limits the upward movement of the main lower bearing block under the pressure of the fluid. The downward movement of the block, when the pressure fails, is limited by the nut abutting a cross-piece or yoke 40 located below the adjusting nut 30ª. The yoke is supported upon guides 41 which preferably take the form of two large bolts arranged at diametrically opposite points and screwed into the bottom plate 20. The ends of the yoke are bifurcated and span the vertically-extending threaded rods 43, the latter being provided with hand wheels or nuts 44. The upper ends of the rods are hinged to bolts 45ª secured in the base 5. By this arrangement, when it is desired to remove the bearing, it is simply necessary to take out the bolts 21, whereupon the weight of the bottom plate, the bearing blocks and yoke will be transferred to the yoke which rests upon the hand wheels. By screwing down the hand wheels the bottom plate carrying with it the lower bearing blocks can be lowered sufficiently to permit of inspection or repair and this without disturbing the alinement. Also the screw rods and hand wheels facilitate the complete removal of the parts, as they can be lowered to a suitable point by the hand wheels to be loaded on a truck and then drawn from the pit. As the ends of the yoke span the screw rods disengagement is readily effected by moving the rods outwardly on their hinges. The main bearing block is normally maintained in its upper position by a pin 45 which is supported by a spring 46. The object of the pin is to normally maintain the blocks in contact so that when the lubricant supply is established it will not find free exit through the space that would otherwise be formed between the blocks. In other words the lower block is mechanically supported in contact with the upper block so as to offer the desired resistance to the flow to cause the pressure in the chamber between the blocks to become sufficient to slightly separate the blocks and by the resultant film support the shaft and its parts. The pin extends through a central opening in the yoke and engages the lower end of the adjusting screw 27. Its supporting spring is seated at its lower end on an adjustable abutment 47 and its upper end engages a shoulder 48 formed on the pin. When the pressure on the step bearing fails the shaft will lower, causing the upper block to contact with the lower bearing block. The latter, however, being spring-supported, will yield under the weight of the shaft sufficiently to permit the auxiliary block to sustain the weight. In order to reduce the wear on the main lower bearing block, its upper surface is provided with an annular groove which receives a removable ring 49. The ring being relatively inexpensive and less difficult to make than the bearing block, reduces the cost of maintenance and repair of the bearing.

Arranged in the casing 19 and at a point above the step bearing is the guide bearing which steadies the shaft and prevents lateral movement thereof. This comprises a shell 50 suitably secured in the casing and lined with segmental strips 51 that extend parallel to the axis of the shell. The longitudinal edges of the strips are beveled to engage with dove-tailed keys 52 that are secured to the shell by screws 53. The keys 52 are countersunk with respect to the segments so as to form grooves between the lining and the shaft. The segments 51 may be made of suitable bearing metal or of wood, such as lignum vitæ. In order to protect the shaft from wear it is desirable to provide a sleeve 54. The guide bearing is lubricated by the fluid that exhausts from the step bearing, the exhaust passing outwardly from the chamber between the two blocks into the space surrounding the latter. This fluid is under sufficient pressure to cause it to flow upwardly through the grooves of the guide bearing so as to lubricate the latter. The lubricant passing from the guide bearing is drained off through a suitable conduit.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A shaft bearing for turbines comprising two adjustable bearing blocks, a screw for adjusting one, a plurality of screws for adjusting the other, and means for simultaneously adjusting the screws of the latter block.

2. A shaft bearing for turbines comprising a rotating element, main and auxiliary bearing blocks which are individually adapted to support said element under different conditions, a member in which the main block is hydraulically supported, means for rigidly supporting the auxiliary block which includes a plurality of screws mounted in said member, and gearing carried by the member for simultaneously rotating the screws to adjust the position of the auxiliary block.

3. A shaft bearing for turbines comprising a rotating member, main and auxiliary bearing blocks which operate independently, a casing for the blocks and member, means for limiting the movement of the main block and for adjusting it, adjusting screws in the casing for supporting the auxiliary block, pinions splined to the screws, a gear meshing with the pinions of the several screws, and means for operating the gear.

4. A shaft bearing for turbines comprising a rotating element, an adjustable block for supporting it, a casing containing the element and block, a head for the casing, adjusting screws arranged in the head upon the ends of which the block rests, pinions splined to the screws, a gear meshing with the pinions for simultaneously operating the screws, there being means on the head forming a bearing for the gear, and a device supported by the said means for rotatably supporting the pinions.

5. A shaft bearing for turbines comprising a casing, a rotating element, a hydraulically supported bearing block therefor, there being a chamber formed between the element and the block, a conduit supplying lubricant under pressure to the chamber to flow outwardly therefrom and maintain a fluid film between the element and the block, and means for maintaining the block in operative relation to the element, comprising a member secured to said block which projects outwardly from the bearing, a yoke mounted on the casing, a device mounted for longitudinal movement on the yoke which engages the end of said member, and a spring carried by the yoke which presses the device against the member.

6. A shaft bearing for turbines comprising a rotating member, a casing, an adjustable block mounted in the casing for supporting the member, a conduit for maintaining a fluid film between said block and member, gearing for adjusting the position of the block, guides secured to one end of the casing, a yoke adjustably mounted on the guides, and an elastic means supported by the yoke which constantly urges the block toward the member.

7. A shaft bearing for turbines comprising a rotating element, a casing, an adjustable block mounted in the casing for supporting the element, a conduit for maintaining a fluid film between the element and the block, a member in which the block is hydraulically supported and urged toward said element, gearing for adjusting the position of the block, guides secured to one end of the casing adjacent said gearing, a yoke slidably mounted on the guides, and a spring pressed pin in the yoke which constantly urges the block toward the element.

8. A shaft bearing for turbines comprising a casing, a rotating member, a hydraulically supported block arranged adjacent to said member, a conduit for maintaining a separating fluid film between them, means which adjusts the position of the block and that also serves as an abutment that engages the casing to limit the upward movement of the block, said means including a screw projecting downward from the block through the casing, and a nut on the screw which forms said abutment, a yoke mounted on the casing below the screw, and a spring-pressed follower carried by the yoke which bears against the end of the screw and moves the block upward under certain conditions.

9. A shaft bearing for elastic-fluid turbines comprising a rotating block, a supporting block, a casing for both, a removable head for the casing which carries the supporting block, and devices which support the weight of the head and block during removal from the bearing casing.

10. A shaft bearing for elastic-fluid turbines comprising an upper block and a lower block, a casing therefor, a removable head for the casing which carries the lower block, means for hydraulically supporting the lower block in said head, screws depending from the exterior of the casing, a yoke under the head which is adapted to support its weight during removal, and nuts on the screws by which the yoke is carried during removal or replacing of the head.

11. A shaft bearing for elastic-fluid turbines comprising an upper and a lower bearing block, a casing therefor, means for adjusting the lower block, a removable head which carries the said means and also the lower block, a yoke arranged below the head which is adapted to support it during removal, depending screws supported at the sides of the casing and below the same which are engaged by the ends of the yoke, and hand wheels on the screws upon which the yoke is movably supported for removing or replacing the head.

12. A shaft bearing comprising a rotatable element, a casing, a main and an auxiliary bearing block mounted in said casing which are adapted to separately support the element under different conditions, a device for supplying fluid under a suitable pressure to hydraulically support the main block and maintain a film between it and the element, and means for maintaining the main block in operative relation to the element to support the latter when the fluid pressure is restored, comprising a member secured to said block which projects outwardly from the bearing, a yoke mounted on the casing, a pin mounted for longitudinal movement in the yoke which engages the end of said member, and a spring mounted on the yoke which presses the pin against the member.

In witness whereof, I have hereunto set my hand this sixth day of November, 1905.

RICHARD H. RICE.

Witnesses:
JOHN A. MCMANUS, Jr.,
HENRY O. WESTENDARP.